United States Patent Office 3,790,548
Patented Feb. 5, 1974

3,790,548
CHLORINATING POLYETHYLENE
Hans-Georg Trieschmann, Hambach, Helmut Pfannmueler, Limburgerhof, and Gerhard Zeitler, Hessheim, Germany, assignors to Badische Anilin- & Soda-Fabrik Aktiengesellschaft, Ludwigshafen (Rhine), Germany
No Drawing. Continuation of abandoned application Ser. No. 820,618, Apr. 30, 1969. This application Feb. 8, 1971, Ser. No. 113,610
Claims priority, application Germany, May 1, 1968, P 17 70 312.7, P 17 70 313.8
Int. Cl. C08f 3/04, 27/02
U.S. Cl. 260—94.9 H    6 Claims

ABSTRACT OF THE DISCLOSURE

A process for chlorination polyethylene in which particulate high-pressure polyethylene is suspended in a chlorohydrocarbon and treated with chlorine.

---

This application is a continuation of abandoned application Ser. No. 820,618, filed Apr. 30, 1969.

The invention relates to a process for chlorinating polyethylene in which particulate polyethylene suspended in a chlorohydrocarbon is treated with chlorine.

Various methods have been adopted in industry for chlorinating high-pressure polyethylene. Thus for example powdered high-pressure polyethylene may be treated with gaseous chlorine in a fluidized bed or in a rotating tube. Difficulties are encountered with these methods, particularly in the production of products having a high chlorine content, because as the chlorine content increases the absorption of chlorine decreases so that fairly long reaction periods are required.

When finely powdered high-pressure polyethylene is chlorinated in aqueous suspension, products having fairly low stability are obtained. Moreover it is usually only possible to obtain moldings having low transparency and this is not usually desirable.

High-pressure polyethylene can also be chlorinated while it is dissolved in a chlorohydrocarbon. Although fairly stable products of high transparency are obtained, chlorination in solution is fairly expensive and troublesome. This is due particularly to the processing of the solutions containing the chlorination product and to the drying of the chlorinated polymer.

It is the object of this invention to provide a process for the chlorination of high-pressure polyethylene which can be carried out easily and rapidly and which gives products having good stability and high transparency.

We have now found that particulate polyethylene can be chlorinated advantageously by suspending polyethylene having a density of from 0.910 to 0.935 in the form of particles having a diameter of from 50 to 800 microns in a low-boiling chlorohydrocarbon and chlorinating it at a temperature of from 5° to 30° C.

The process is suitable for the chlorination of high-pressure polyethylene whose density is within the range from 0.910 to 0.935 and whose molecular weight is within the range from 10,000 to 180,000. The polymers should be present in the form of compact particles whose diameters are from 50 to 800 microns, preferably from 200 to 600 microns.

Chlorination is carried out in a low-boiling chlorohydrocarbon whose boiling point is advantageously within the range from 30° to 90° C. Carbon tetrachloride, chloroform and trichloroethane are particularly suitable. Chlorination is carried out at a temperature of from 5° to 30° C., advantageously at from 15° to 23° C. Sometimes it is advantageous to carry out chlorination under the action of light, ultraviolet light or high-energy radiation or in the presence of chlorination catalysts such as peroxides.

The reaction zone contains 300 to 1500, preferably 600 to 1000, parts by weight of chlorohydrocarbon for each 100 parts by weight of polyethylene.

It is possible first to suspend the polyethylene in the chlorohydrocarbon and then to introduce the chlorine. The amount of chlorine in solution should be as high as possible. It is advantageous to supply more than 20 parts of chlorine, particularly from 50 to 100 parts, per hour for each 100 parts of polyethylene.

It is also possible however to introduce the polyethylene into solutions of chlorine in chlorohydrocarbons. In this case it is advantageous to use solutions in which from 5 to 20 parts of chlorine is dissolved in 100 parts of chlorohydrocarbon.

When this latter method is used, the process according to this invention can be carried out continuously. Chlorination is then carried out in a reaction zone having a length which is a multiple of its width, for example in a reaction tube whose length is from 300 to 1000 times its diameter.

In the continuous process particulate polyethylene and a solution of chlorine in a chlorohydrocarbon are introduce continuously into a reaction zone. It is advantageous to use from 300 to 1200 parts of solution for each 100 parts of polyethylene. The amount depends on the desired degree of conversion and chlorination. For example if it is intended to prepare a chlorinated polyethylene having a chlorine content of 30%, 800 parts of a solution containing 90 parts of chlorine is used for each 100 parts of polyethylene.

The mixture of particulate polyethylene and chlorine solution is then passed through the reaction zone at the flow rate of 0.05 to 1 meter per second. If a higher flow rate than this is used, the mixture may leave the reaction zone before all the chlorine has been used up. If a lower flow rate is used, the suspension may separate and the residence times become obscure.

The mixture is passed through the reaction zone for a period of from one to fifteen minutes. The period depends on the rate of flow and the desired degree of conversion. Depending on the temperature and the relative amounts, a flow rate and a reaction period are chosen at which the total amount of chlorine in solution is reacted with the polyethylene.

The chlorination product can easily be separated from the liquid phase by filtration or some other mechanical method. The hydrochloric acid formed is distilled off under standard conditions. The chlorinated particulate polyethylene may be dried easily and without special precautions. The process according to this invention therefore has the advantage of chlorinating in liquid phase, but does not have the disadvantage of processing such as is necessary in methods in which chlorination is carried out in solution.

The chlorinated polyethylene may be used alone or mixed with other plastics, for example with polyethylene or polyvinyl chloride, as molding material. Film, sheeting and moldings prepared from polyethylene chlorinated according to the process of this invention are distinguished by special transparency.

The process of the invention has the advantage that chlorinated high-pressure polyethylenes having the desired degree of chlorination can be prepared in a particularly simple way. Special instrumentation is not required.

The invention is illustrated by the following examples. The parts and percentages specified in the examples are by weight.

EXAMPLE 1

100 parts of high-pressure polyethylene having a molecular weight of 50,000, a density of 0.915 and a particle size of from 400 to 600 microns is suspended in 600 parts of carbon tetrachloride and treated while stirring at 20° C. with 50 parts of gaseous chlorine per hour. After two hours the supply of chlorine is stopped and the whole is stirred for another hour for complete removal of dissolved chlorine. The hydrochloric acid formed is expelled with gaseous nitrogen. The powdery reaction product having a chlorine content of 30.2% is filtered off and dried. It can be processed with a conventional stabilizer on conventional equipment into sheeting, tubes and the like.

EXAMPLE 2

100 parts of high-pressure polyethylene is suspended as described in Example 1 in 800 parts of carbon tetrachloride and treated at 20° C. with 70 parts of gaseous chlorine per hour. The product has a chlorine content of 20% after forty-five minutes.

EXAMPLE 3

100 parts of powdered high-pressure polyethylene having a molecular weight of 100,000, a density of 0.918 and a particle size of from 400 to 700 microns is suspended in 800 parts of carbon tetrachloride while stirring and treated at 20° C. with 100 parts of gaseous chlorine per hour. Seventy minutes later a product having a chlorine content of 34.6% is obtained.

EXAMPLE 4

50 parts of powdered high-pressure polyethylene having a molecular weight of 50,000, a density of 0.918 and a particle size of from 300 to 500 microns is introduced in the course of two to three minutes at 10° C. while stirring into a solution of 60 parts of chlorine in 450 parts of carbon tetrachloride. Reaction commences after a short time. The temperature is kept at 20° C. by intense cooling. Eight minutes later the chlorine has been completely absorbed. Hydrogen chloride gas left in the carbon tetrachloride is expelled with air in the course of five minutes. The chlorinated polyethylene is filtered off and and dried in the usual way. A product is obtained having a chlorine content of 36.2%.

EXAMPLE 5

50 parts of powdered high-pressure polyethylene having a density of 0.931, a molecular weight of 110,000 and a particle size of 200 to 800 microns is introduced into a solution of 50 parts of chlorine in 500 parts of carbon tetrachloride at 0° C. The temperature is raised while stirring. The reaction begins at 10° C. The temperature is kept at 22° C. by cooling; four minutes later all the chlorine has been used up. A chlorinated polyethylene having a chlorine content of 27% is obtained.

EXAMPLE 6

800 parts per hour of a solution of 8 parts of chlorine in 100 parts of carbon tetrachloride is introduced into a mixing vessel continuously and mixed therein with 90 parts of powdered high-pressure polyethylene. The polyethylene has a particle diameter of from 300 to 700 microns and a density of 0.915.

This mixture is introduced continuously into a reaction tube having a length which is 500 times its diameter. The total volume of the reaction zone is one sixth of the volume of solution and polyethylene introduced into the reaction zone per hour. The temperature in the reaction zone is kept at 20° C. by external cooling of the tube. The solution is passed through the reaction zone at a flow rate of 0.07 meter per second and leaves it after a residence time of eight minutes. Residual hydrogen chloride is removed from the suspension leaving the reaction zone by passing air through. The chlorinated polyethylene may easily be filtered off and dried in the usual way. A product is obtained which has a chlorine content of 25.6%. The chlorinated polyethylene is particularly suitable for the production of film and sheeting that is particularly transparent.

EXAMPLE 7

40 kg. of a mixture of 34 kg. of carbon tetrachloride, 3 kg. of chlorine and 3 kg. of powdered high-pressure polyethylene is introduced continuously per hour into a reaction tube having a diameter of 0.01 meter and a length of 6.0 meters. The polyethylene has a molecular weight of 150,000, a density of 0.930 and a particle size of from 200 to 800 microns. The mixture is introduced into the tube at a temperature of 4° C. and kept therein at a temperature of 25° C. It is passed through the reaction tube at the rate of about 0.1 meter per second. The residence time is thus about one minute. The chlorine introduced is reacted almost quantitatively.

The chlorinated polyethylene has a chlorine content of 30%.

We claim:

1. A continuous process for the chlorination of polyethylene which comprises: suspending high pressure polyethylene having a particle size of from 50 to 800 microns, a molecular weight of from 10,000 to 180,000 and a density of from 0.910 to 0.935 in a solution of chlorine in a chlorohydrocarbon having a boiling point of from 30° to 90° C.; passing this suspension continuously through a reaction zone whose length is a multiple of its diameter at a flow rate of 0.05 to 1 meter per second for a period of from one to fifteen minutes thus effecting chlorination at a temperature of from 5° to 30° C.; the amount of chlorohydrocarbon-chlorine solution being from 300 to 1,500 parts by weight per 100 parts by weight of polyethylene and the amount of chlorine dissolved in said solution being from 5 to 20 per 100 parts of chlorohydrocarbon; continually withdrawing the reaction mixture from said reaction zone, said reaction mixture containing chlorohydrocarbon having suspended therein particles of uniformly chlorinated polyethylene; separating the solid chlorinated polyethylene from the chlorohydrocarbon and drying said solid chlorinated polyethylene.

2. A process as in claim 1, wherein the polyethylene has a particle size of from 200 to 600 microns.

3. A process as in claim 1 wherein polyethylene in the form of particles having a diameter of from 200 to 600 microns is chlorinated.

4. A process as in claim 1 wherein the chlorohydrocarbon used is carbon tetrachloride.

5. A process as in claim 1 wherein from 600 to 1000 parts of chlorohydrocarbon is used for each 100 parts of polyethylene.

6. A process as in claim 1 wherein the length of the reaction zone is from 300 to 1000 times its diameter.

References Cited

UNITED STATES PATENTS

| | | | |
|---|---|---|---|
| 2,183,556 | 12/1939 | Fawcett | 260—94.9 H |
| 3,597,408 | 8/1971 | Tvieschmann et al. | 260—94.9 H |
| 3,607,855 | 9/1971 | Tvieschmann et al. | 260—94.9 H |
| 2,183,556 | 12/1939 | Fawcett | 260—94.9 X |
| 2,906,743 | 9/1959 | Heitzer et al. | 260—94.9 |
| 2,928,819 | 3/1960 | Noeske | 260—94.9 |
| 3,192,188 | 6/1965 | Ovthner et al. | 260—94.9 VX |
| 3,282,910 | 11/1966 | Klug et al. | 260—94.9 |
| 2,481,188 | 9/1948 | Babayan | 260—94.9 |

FOREIGN PATENTS

| | | | |
|---|---|---|---|
| 855,714 | 12/1960 | Great Britain | 260—94.9 |
| 882,524 | 11/1961 | Great Britain | 260—94.9 |

JOSEPH L. SCHOFER, Primary Examiner

W. F. HAMROCK, Assistant Examiner

U.S. Cl. X.R.

260—96 HAL

UNITED STATES PATENT OFFICE
CERTIFICATE OF CORRECTION

Patent No. 3,790,548  Dated February 5, 1974

Inventor(s) Hans-Georg Trieschmann et al

It is certified that error appears in the above-identified patent and that said Letters Patent are hereby corrected as shown below:

Column 1, line 3, "Pfanmueller" should read -- Pfannmueller --.

Column 1, line 15, "chlorination" should read -- chlorinating --

Signed and sealed this 22nd day of October 1974.

(SEAL)
Attest:

McCOY M. GIBSON JR.
Attesting Officer

C. MARSHALL DANN
Commissioner of Patents